United States Patent
Su et al.

(10) Patent No.: US 12,530,459 B2
(45) Date of Patent: Jan. 20, 2026

(54) PROVIDING SECURITY WITH A WEB EXTENSION CONTROL BOT

(71) Applicant: INTERNATIONAL BUSINESS MACHINES CORPORATION, Armonk, NY (US)

(72) Inventors: Jun Su, Beijing (CN); Su Liu, Austin, TX (US); Yang Liang, Beijing (CN); Li Li, Cedar Park, TX (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 91 days.

(21) Appl. No.: 18/428,429

(22) Filed: Jan. 31, 2024

(65) Prior Publication Data

US 2025/0245331 A1    Jul. 31, 2025

(51) Int. Cl.
*G06F 21/57*     (2013.01)
*G06F 16/958*    (2019.01)

(52) U.S. Cl.
CPC ............ *G06F 21/57* (2013.01); *G06F 16/986* (2019.01)

(58) Field of Classification Search
CPC ................................ G06F 21/57; G06F 16/986
See application file for complete search history.

(56) References Cited

U.S. PATENT DOCUMENTS

| | | | |
|---|---|---|---|
| 8,935,755 B1 | 1/2015 | Kay | |
| 9,692,787 B1 | 6/2017 | Warner et al. | |
| 9,870,116 B1* | 1/2018 | Yasskin | G06F 9/44526 |
| 11,188,647 B2 | 11/2021 | Shafet et al. | |
| 11,429,734 B2* | 8/2022 | Shivakumar | H04L 63/168 |
| 11,765,165 B2 | 9/2023 | Bishop, III et al. | |
| 2009/0144829 A1* | 6/2009 | Grigsby | G06F 21/6263 726/26 |
| 2015/0007330 A1 | 1/2015 | Gomez | |
| 2017/0039390 A1* | 2/2017 | King | G06F 16/958 |
| 2022/0222089 A1 | 7/2022 | Joshi et al. | |

(Continued)

FOREIGN PATENT DOCUMENTS

| | | |
|---|---|---|
| EP | 3765974 A1 | 1/2021 |
| WO | 2019177818 A1 | 9/2019 |

OTHER PUBLICATIONS

"A Standard and Method to Classify Content of Web Pages in Fine Granularity," IP.com, IP.com No. IPCOM000259180D, Jul. 18, 2019, 3 pp.

(Continued)

*Primary Examiner* — Beemnet W Dada
(74) *Attorney, Agent, or Firm* — Konrad, Raynes, Davda & Victor, LLP; Janaki K. Davda

(57) ABSTRACT

Provided are techniques for providing security with a Web Extension Control Bot (WEC-Bot). A request is transmitted for analysis of a web page that is associated with an extension and with a Uniform Resource Locator (URL). A sensitive sub web page with sensitive content and a non-sensitive sub web page with non-sensitive content for the web page are received. The non-sensitive sub web page is sent to the extension. Output is received from the extension for the non-sensitive sub web page. The sensitive sub web page is modified to hide the sensitive content. The web page is displayed with the output from the extension for the non-sensitive sub web page and with the modified sensitive sub web page.

20 Claims, 14 Drawing Sheets

(56) References Cited

U.S. PATENT DOCUMENTS

2023/0004637 A1* 1/2023 Wang .................. G06F 21/53
2023/0039079 A1* 2/2023 Philip ................ G06F 21/6281

OTHER PUBLICATIONS

"Browser Extension Guide," github.com, 6 pp., [online][retrieved Jan. 21, 2024] https://github.com/uncommonhacks/browser-extension-guide/blob/master/extension-architecture.md.

"Extension Concepts and Architecture," Microsoft.com, Jun. 19, 2023, 5 pp., [online][retrieved Jan. 21, 2024] https://learn.microsoft.com/en-us/microsoft-edge/extensions-chromium/getting-started/.

"Generating a User-Specific Reduced Content Webpage," IP.com, IP.com No. IPCOM000252355D, Jan. 5, 2018, 39 pp.

A. Yip, et al., "Privacy-Preserving Browser-Side Scripting With BFlow," ACM, EuroSys'09, Proceedings of the 4th ACM European Conference on Computer Systems, Apr. 1-3, 2009, 14 pp. (available at: https://dl.acm.org/doi/10.1145/1519065.1519091).

D. Rousset, "Creating One Browser Extension for All Browswers: Edge, Chrome, Firefox, Opera, Brave and Vivaldi," Smashingmagazine.com, Apr. 5, 2017, 39 pp., [online][retrieved Jan. 21, 2024] https://www.smashingmagazine.com/2017/04/browser-extension-edge-chrome-firefox-opera-brave-vivaldi/.

Mell, P. et al., "Effectively and Securely Using the Cloud Computing Paradigm", [online], Oct. 7, 2009, retrieved from the Internet at <URL: http://csrc.nist.gov/groups/SNS/cloud-computing/cloud-computing-v26.ppt>, Total 80 pp.

Mell, P. et al., "The NIST Definition of Cloud Computing (Draft)", Sep. 2011, Computer Security Division Information Technology Laboratory National Institute of Standards and Technology, Total 7 pp.

N.S. Mathews, et al., "Detox Browser—Towards Filtering Sensitive Content On the Web," arXiv:2106.09937v1, Jun. 18, 2021, 6 pp. (available at: https://arxiv.org/abs/2106.09937).

Q. Menoret, "Browser Extension-Extension Architecture," DEV Community, Jan. 25, 2021, 8 pp., [online] [retrieved Jan. 21, 2024] https://dev.to/qmenoret/browser-extension-extension-architecture-13m1.

* cited by examiner

234 — | Extension Identifier | Extension Type | URL Identifier | URL Type | Section Identifier | Content | Content Type | Restriction |

Web Page 700

Test.html.txt

I acknowledge my prior and ongoing obligations to sell, assign, and transfer my rights under this Assignment to the ASSIGNEE...

I hereby acknowledge that any willful false statement made in this declaration is punishable under 18 U.S.C. § 1001 by fine or imprisonment of not more than five (5) years, or both.

Signature:
Legal Name of Inventor: Peter Smith
Telephone Number: 1234567890
Home Address: 123 ABC
Date:

Sensitive Content 710

Summarize & Chat — 720

Summarize    Ask question (Beta)

- The declarant acknowledges that any willful false statement declaration is punishable under 18 U.S.C. § 1001.
- Punishment may include a fine, imprisonment of not more than 5 years, or both.
- ✏ Signature and Personal Information:
  - Signature: [Signature]
  - Legal Name of Inventor: Peter Smith
  - Telephone Number: 1234567890
  - Home Address: 123 ABC
  - Date: [Date]

Sensitive Content 730

PROVIDING SECURITY WITH A WEB EXTENSION CONTROL BOT

BACKGROUND

Embodiments of the invention relate to providing security with a Web Extension Control Bot (WEC-Bot).

Web browser extensions ("extensions"), often referred to as browser add-ons or plugins, have become integral to the modern web browsing experience. The web browser extensions may be described as small software modules that enhance browser functionality. The web browser extensions offer users a wide range of features and customizations that cater to their individual needs and preferences. From ad blockers and password managers to productivity tools and security enhancements, web browser extensions have extended the capabilities of web browsers.

However, the web browser extensions have also introduced security and sensitive content protection concerns. For example, as the web browser extensions have the ability to access and manipulate web content, the web browser extensions also possess the potential to interact with sensitive user content and have an impact on the overall security of web browsing.

SUMMARY

In accordance with certain embodiments, a computer-implemented method comprising operations is provided for providing security with a Web Extension Control Bot (WEC-Bot). In such embodiments, a request is transmitted for analysis of a web page that is associated with an extension and with a Uniform Resource Locator (URL). A sensitive sub web page with sensitive content and a non-sensitive sub web page with non-sensitive content for the web page are received. The non-sensitive sub web page is sent to the extension. Output is received from the extension for the non-sensitive sub web page. The sensitive sub web page is modified to hide the sensitive content. The web page is displayed with the output from the extension for the non-sensitive sub web page and with the modified sensitive sub web page.

In accordance with other embodiments, a computer program product comprising a computer readable storage medium having program code embodied therewith is provided, where the program code is executable by at least one processor to perform operations for providing security with a Web Extension Control Bot (WEC-Bot). In such embodiments, a request is transmitted for analysis of a web page that is associated with an extension and with a Uniform Resource Locator (URL). A sensitive sub web page with sensitive content and a non-sensitive sub web page with non-sensitive content for the web page are received. The non-sensitive sub web page is sent to the extension. Output is received from the extension for the non-sensitive sub web page. The sensitive sub web page is modified to hide the sensitive content. The web page is displayed with the output from the extension for the non-sensitive sub web page and with the modified sensitive sub web page.

In accordance with yet other embodiments, a computer system comprises one or more processors, one or more computer-readable memories and one or more computer-readable, tangible storage devices; and program instructions, stored on at least one of the one or more computer-readable, tangible storage devices for execution by at least one of the one or more processors via at least one of the one or more memories, to perform operations for providing security with a Web Extension Control Bot (WEC-Bot). In such embodiments, a request is transmitted for analysis of a web page that is associated with an extension and with a Uniform Resource Locator (URL). A sensitive sub web page with sensitive content and a non-sensitive sub web page with non-sensitive content for the web page are received. The non-sensitive sub web page is sent to the extension. Output is received from the extension for the non-sensitive sub web page. The sensitive sub web page is modified to hide the sensitive content. The web page is displayed with the output from the extension for the non-sensitive sub web page and with the modified sensitive sub web page.

BRIEF DESCRIPTION OF THE DRAWINGS

Referring now to the drawings in which like reference numbers represent corresponding parts throughout:

FIG. 3 illustrates an example data structure in accordance with certain embodiments.

FIG. 7 illustrates an example web page and summary in accordance with certain embodiments.

DETAILED DESCRIPTION

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer-readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer-readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

Figure 1A:
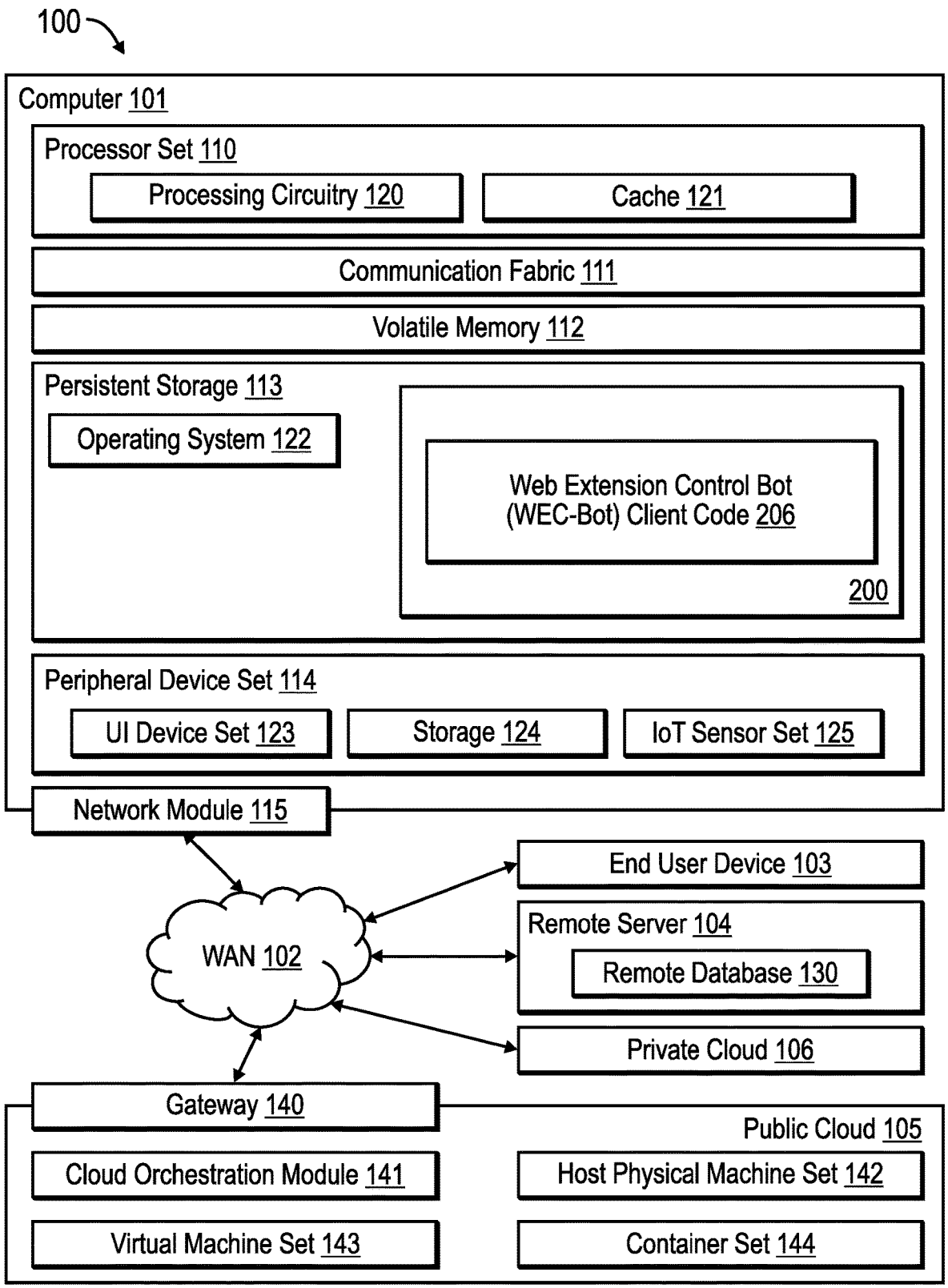
FIGS. 1A and 1B illustrate computing environments in accordance with certain embodiments.
Figure 1B:
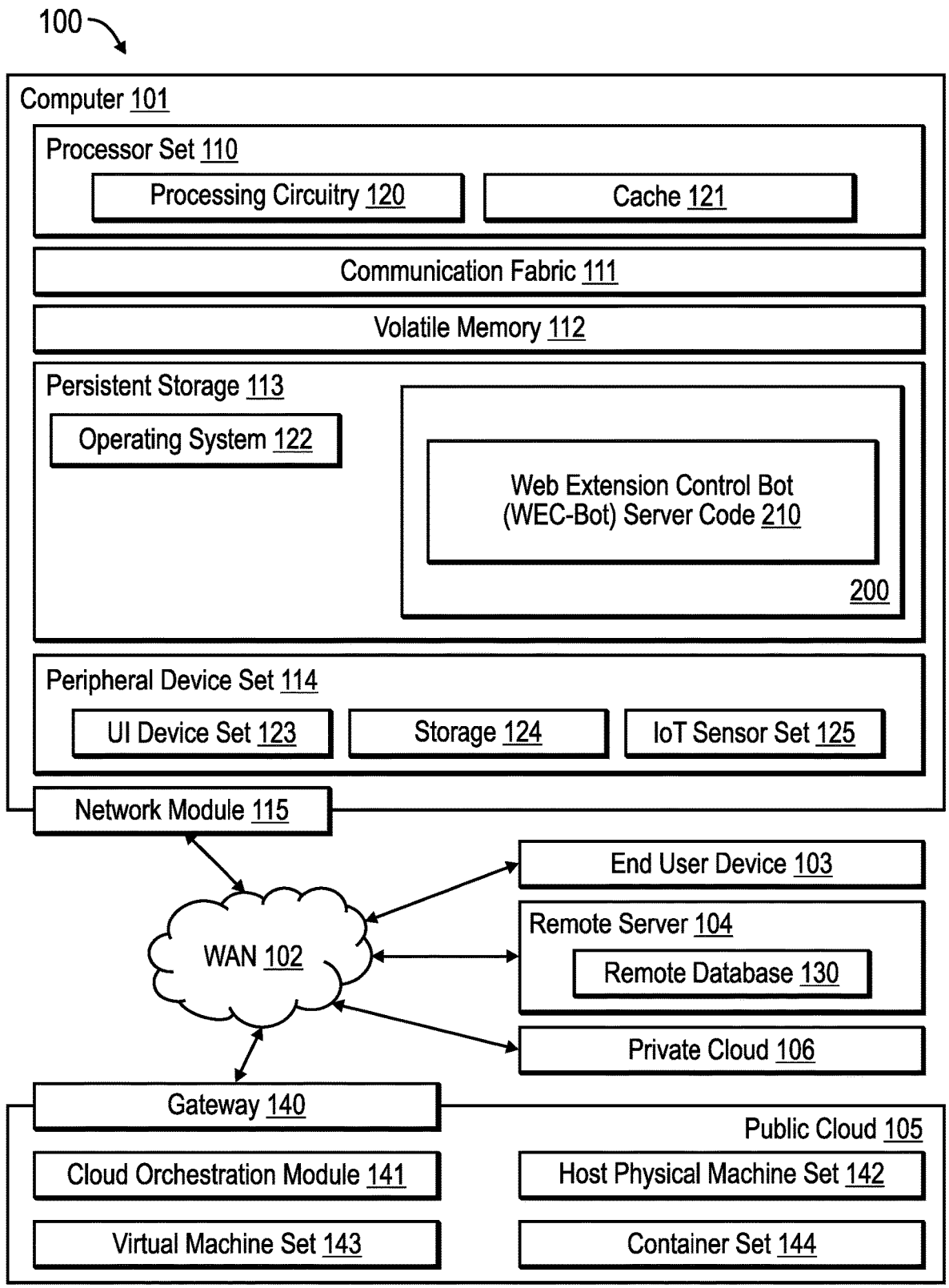

Computing environment 100 of FIG. 1A contains an example of an environment for the execution of at least some of the computer code involved in performing the inventive methods, such as WEC-Bot client code 206 of block 200. Computer environment 100 of FIG. 1B contains an example of an environment for the execution of at least some of the computer code involved in performing the inventive methods, such as WEC-Bot server code 210 of block 200.

In addition to block 200, computing environment 100 includes, for example, computer 101, wide area network (WAN) 102, end user device (EUD) 103, remote server 104, public cloud 105, and private cloud 106. In this embodiment, computer 101 includes processor set 110 (including processing circuitry 120 and cache 121), communication fabric 111, volatile memory 112, persistent storage 113 (including operating system 122 and block 200, as identified above), peripheral device set 114 (including user interface (UI) device set 123, storage 124, and Internet of Things (IoT) sensor set 125), and network module 115. Remote server 104 includes remote database 130. Public cloud 105 includes gateway 140, cloud orchestration module 141, host physical machine set 142, virtual machine set 143, and container set 144.

COMPUTER 101 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 130. As is well understood in the art of computer technology, and depending upon the technology, performance of a computer-implemented method may be distributed among multiple computers and/or between multiple locations. On the other hand, in this presentation of computing environment 100, detailed discussion is focused on a single computer, specifically computer 101, to keep the presentation as simple as possible. Computer 101 may be located in a cloud, even though it is not shown in a cloud in FIG. 1. On the other hand, computer 101 is not required to be in a cloud except to any extent as may be affirmatively indicated.

PROCESSOR SET 110 includes one, or more, computer processors of any type now known or to be developed in the future. Processing circuitry 120 may be distributed over multiple packages, for example, multiple, coordinated integrated circuit chips. Processing circuitry 120 may implement multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set may be located "off chip." In some computing environments, processor set 110 may be designed for working with qubits and performing quantum computing.

Computer-readable program instructions are typically loaded onto computer 101 to cause a series of operational steps to be performed by processor set 110 of computer 101 and thereby effect a computer-implemented method, such that the instructions thus executed will instantiate the methods specified in flowcharts and/or narrative descriptions of computer-implemented methods included in this document (collectively referred to as "the inventive methods"). These computer-readable program instructions are stored in various types of computer-readable storage media, such as cache 121 and the other storage media discussed below. The program instructions, and associated data, are accessed by processor set 110 to control and direct performance of the inventive methods. In computing environment 100, at least some of the instructions for performing the inventive methods may be stored in block 200 in persistent storage 113.

COMMUNICATION FABRIC 111 is the signal conduction path that allows the various components of computer 101 to communicate with each other. Typically, this fabric is made of switches and electrically conductive paths, such as the switches and electrically conductive paths that make up buses, bridges, physical input/output ports and the like. Other types of signal communication paths may be used, such as fiber optic communication paths and/or wireless communication paths.

VOLATILE MEMORY 112 is any type of volatile memory now known or to be developed in the future. Examples include dynamic type random access memory (RAM) or static type RAM. Typically, volatile memory 112 is characterized by random access, but this is not required unless affirmatively indicated. In computer 101, the volatile memory 112 is located in a single package and is internal to computer 101, but, alternatively or additionally, the volatile memory may be distributed over multiple packages and/or located externally with respect to computer 101.

PERSISTENT STORAGE 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read only memory (ROM), but typically at least a portion of the persistent storage allows writing of data, deletion of data and re-writing of data. Some familiar forms of persistent storage include magnetic disks and solid state storage devices. Operating system 122 may take several forms, such as various known proprietary operating systems or open source Portable Operating System Interface-type operating systems that employ a kernel. The code included in block 200 typically includes at least some of the computer code involved in performing the inventive methods.

PERIPHERAL DEVICE SET 114 includes the set of peripheral devices of computer 101. Data communication connections between the peripheral devices and the other components of computer 101 may be implemented in various ways, such as Bluetooth connections, Near-Field Communication (NFC) connections, connections made by cables (such as universal serial bus (USB) type cables), insertion-type connections (for example, secure digital (SD) card), connections made through local area communication networks and even connections made through wide area networks such as the internet. In various embodiments, UI device set 123 may include components such as a display screen, speaker, microphone, wearable devices (such as goggles and smart watches), keyboard, mouse, printer, touchpad, game controllers, and haptic devices. Storage 124 is external storage, such as an external hard drive, or insertable storage, such as an SD card. Storage 124 may be persistent and/or volatile. In some embodiments, storage 124 may take the form of a quantum computing storage device for storing data in the form of qubits. In embodiments where computer 101 is required to have a large amount of storage (for example, where computer 101 locally stores and manages a large database) then this storage may be provided by peripheral storage devices designed for storing very large amounts of data, such as a storage area network (SAN) that is shared by multiple, geographically distributed computers. IoT sensor set 125 is made up of sensors that can be used in Internet of Things applications. For example, one sensor may be a thermometer and another sensor may be a motion detector.

NETWORK MODULE 115 is the collection of computer software, hardware, and firmware that allows computer 101 to communicate with other computers through WAN 102. Network module 115 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 115 are performed on the same physical hardware device. In other embodiments (for example, embodiments that utilize software-defined networking (SDN)), the control functions and the forwarding functions of network module 115 are performed on physically separate devices, such that the control functions manage several different network hardware devices. Computer-readable program instructions for performing the inventive methods can typically be downloaded to computer 101 from an external computer or external storage device through a network adapter card or network interface included in network module 115.

WAN 102 is any wide area network (for example, the internet) capable of communicating computer data over non-local distances by any technology for communicating computer data, now known or to be developed in the future. In some embodiments, the WAN 102 may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

END USER DEVICE (EUD) 103 is any computer system that is used and controlled by an end user (for example, a customer of an enterprise that operates computer 101), and may take any of the forms discussed above in connection with computer 101. EUD 103 typically receives helpful and useful data from the operations of computer 101. For example, in a hypothetical case where computer 101 is designed to provide a recommendation to an end user, this recommendation would typically be communicated from network module 115 of computer 101 through WAN 102 to EUD 103. In this way, EUD 103 can display, or otherwise present, the recommendation to an end user. In some embodiments, EUD 103 may be a client device, such as thin client, heavy client, mainframe computer, desktop computer and so on.

REMOTE SERVER 104 is any computer system that serves at least some data and/or functionality to computer 101. Remote server 104 may be controlled and used by the same entity that operates computer 101. Remote server 104 represents the machine(s) that collect and store helpful and useful data for use by other computers, such as computer 101. For example, in a hypothetical case where computer 101 is designed and programmed to provide a recommendation based on historical data, then this historical data may be provided to computer 101 from remote database 130 of remote server 104.

PUBLIC CLOUD 105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 105 is performed by the computer hardware and/or software of cloud orchestration module 141. The computing resources provided by public cloud 105 are typically implemented by virtual computing environments that run on various computers making up the computers of host physical machine set 142, which is the universe of physical computers in and/or available to public cloud 105. The virtual computing environments (VCEs) typically take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 141 manages the transfer and storage of images, deploys new instantiations of VCEs and manages active instantiations of VCE deployments. Gateway 140 is the collection of computer software, hardware, and firmware that allows public cloud 105 to communicate through WAN 102.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

PRIVATE CLOUD 106 is similar to public cloud 105, except that the computing resources are only available for use by a single enterprise. While private cloud 106 is depicted as being in communication with WAN 102, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 105 and private cloud 106 are both part of a larger hybrid cloud.

CLOUD COMPUTING SERVICES AND/OR MICRO-SERVICES (not separately shown in FIG. 1): private and public clouds 106 are programmed and configured to deliver cloud computing services and/or microservices (unless otherwise indicated, the word "microservices" shall be interpreted as inclusive of larger "services" regardless of size). Cloud services are infrastructure, platforms, or software that are typically hosted by third-party providers and made available to users through the internet. Cloud services facilitate the flow of user data from front-end clients (for example, user-side servers, tablets, desktops, laptops), through the internet, to the provider's systems, and back. In some embodiments, cloud services may be configured and orchestrated according to as "as a service" technology paradigm where something is being presented to an internal or external customer in the form of a cloud computing service. As-a-Service offerings typically provide endpoints with which various customers interface. These endpoints are typically based on a set of APIs. One category of as-a-service offering is Platform as a Service (PaaS), where a service provider provisions, instantiates, runs, and manages a modular bundle of code that customers can use to instantiate a computing platform and one or more applications, without the complexity of building and maintaining the infrastructure typically associated with these things. Another category is Software as a Service (SaaS) where software is centrally hosted and allocated on a subscription basis. SaaS is also known as on-demand software, web-based software, or web-hosted software. Four technological sub-fields involved in cloud services are: deployment, integration, on demand, and virtual private networks.

Figure 2:
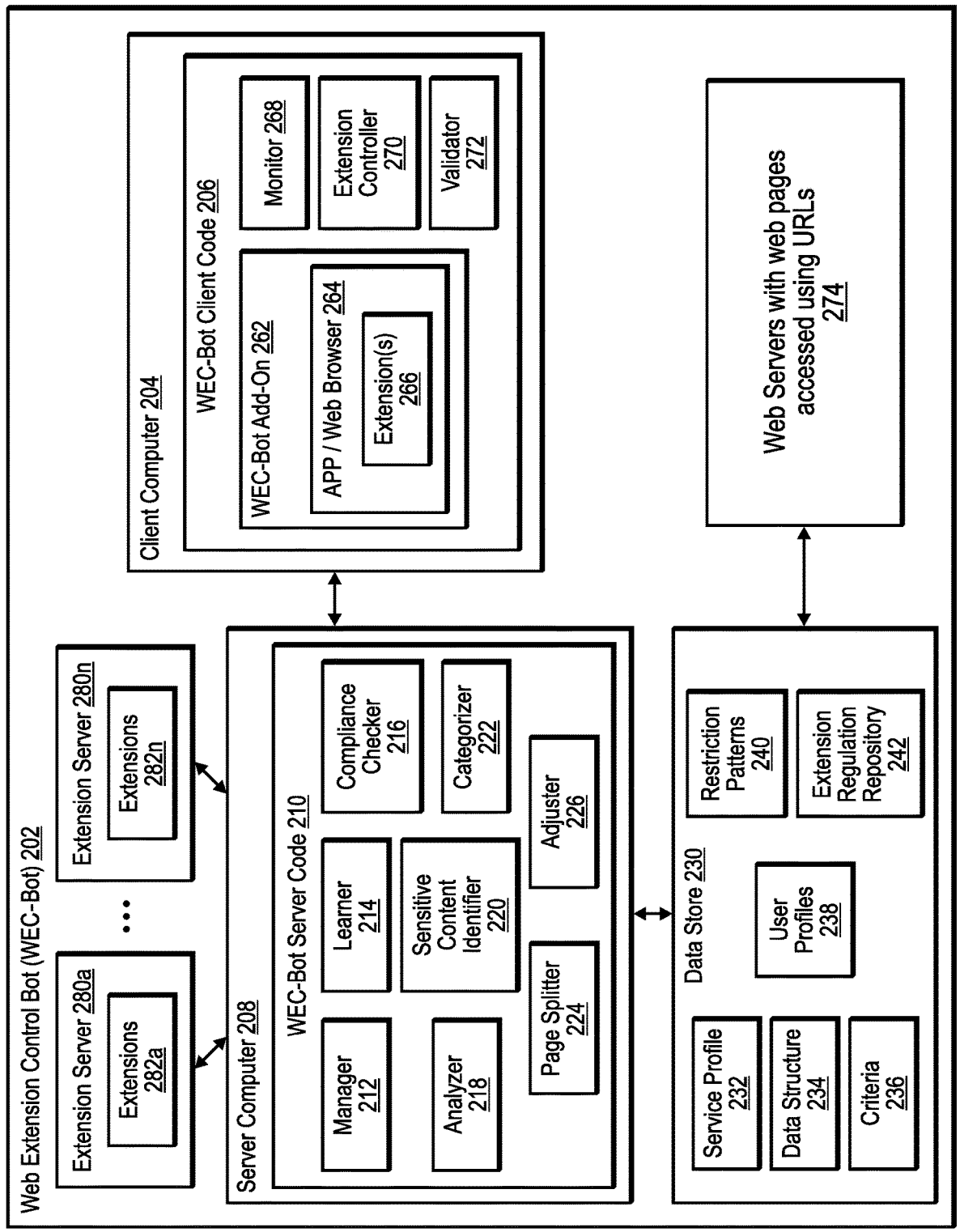
FIG. 2 illustrates further details of a WEC-Bot computing environment in accordance with certain embodiments.

FIG. 2 illustrates further details of a WEC-Bot 202 computing environment in accordance with certain embodiments. The WEC-Bot 202 includes a server computer 208, one or more extension servers 282a . . . 282n, and a client computer 204.

The server computer 208 is connected to the one or more extension servers 282a . . . 282n and to the client computer 204. The server computer 208 includes the WEC-Bot server code 210. The client computer 204 includes a WEC-Bot client code 206. In certain embodiments, such as embodiments of FIG. 1A, the server computer 208 and the one or more extension servers 282a . . . 282n are remote servers 104. In certain embodiments, such as embodiments of FIG. 1B, the client computer 204 is an end user device 103, while the one or more extension servers 282a . . . 282n are remote servers 104. In certain embodiments, the processing by the WEC-Bot 202 is performed on one computer system. That is, in certain embodiments, the functions of both the WEC-Bot client code 206 and the WEC-Bot server code 210 may be performed at one computer of a cloud computing environment, at one computer of a server-client computing environment or at one computer of an edged computing environment.

The WEC-Bot server code 210 includes a manager 212, a learner 214, a compliance checker 216, an analyzer 218, a sensitive content identifier 220, a categorizer 222, a page splitter 224, and an adjuster 226.

The server computer 208 is connected to a data store 230. In certain embodiments, the data store 230 is physical storage (e.g., a set of disk drives). The data store 230 includes a service profile 232, a data structure 234, and criteria 236. The data store 230 also includes user profiles 238, restriction patterns 240, and an extension regulation repository 242.

The WEC-Bot client code 206 includes an WEC-Bot add-on 262, a monitor 268, an extension controller 270, and a validator 272. The WEC-Bot add-on 262 is installed in an application ("APP") or a web browser 264, which include one or more extensions 266. The one or more extensions 266 are ones retrieved from the extension servers 280a . . . 280n.

In addition, the server computer 208 is connected to web servers with web pages accessed using Uniform Resource Locators (URLs) 274.

The WEC-Bot 202 defines and supports granular content categorization at a user interaction level for proactively mitigating security risks and intelligently improving the user web extension experience. User interaction may also be referred to as human computer interaction with the client computer 204. The WEC-Bot 202 identifies the web sections that have sensitive content according to the content and extensions in a given web page. The WEC-Bot 202 classifies the identified web sections according to the different web extension services (e.g., summarization, translation, Optical Character Recognition (OCR), etc.). The WEC-Bot 202 restricts and contains certain extension features in the user defined sections.

The sensitive content may be a name, address, telephone number, credit card number, social security number, etc.

The WEC-Bot 202 framework includes the WEC-Bot server code 210 and the WEC-Bot client code 206.

The WEC-Bot 202 framework provides a data structure 234 that is used when restricting and containing certain extension services in the user defined sections.

FIG. 3 illustrates an example data structure 234 in accordance with certain embodiments. The data structure 234 may be referred to as WEC-Bot_Data. The data structure 234 includes fields for: an extension identifier (ID), an extension type (trusted or not trusted), a URL ID, URL type (trusted or not trusted), section ID, content type (public or private), content, and restriction.

The WEC-Bot 202 framework defines the WEC-Bot add-on 262, which is an add-on (e.g., a plugin or extension and/or an application) that is installed in an application (APP) and/or web browser 264 for managing the installed extensions 266.

Users (e.g., system administrators or other users) may configure and customize the WEC-Bot settings. For example, the user may enable/disable the WEC-Bot, manage extensions, manage registered URLs (e.g., which are trusted and which are not trusted), manage a set of security and extension compliance rules, manage attributes of the data structure 234, and manage the criteria 236. The criteria 236 may be security-based restriction levels/rules (e.g., restrict access to an entire web page if detecting any company confidential content, restrict access to sections of the web page if detecting sensitive information, etc.).

The manager 212 allows users to interact with the WEC-Bot. For instance, the manager 212 enables the users to view and modify data in the service profile 232, the user profiles 238, and the criteria 236. In certain embodiments, the manager 212 enables the users to view categorization decisions, override automated controls, and provide feedback on extension behavior. In certain embodiments, the service profile 232 may include any WEC-Bot settings and configuration information, such as any required attributes of the data structure 234 and universal criteria defined by the system administrator. In certain embodiments, the user profiles 238 include user characteristics, preferences, customized criteria, etc. In certain embodiments, the criteria 236 includes security-based restriction levels (e.g., restrict access to entire web page if any company confidential content is detected, restrict access to sections of the web page if sensitive information is detected in any section, etc.).

The compliance checker 216 checks related data protection regulations and sensitive content protection laws in the extension regulation repository 242, alerting users to potential compliance issues. In certain embodiments, the extension regulation repository 242 may include defined and/or learned regulations and/or policies of a country, company or group. Then, the compliance checker 216 identifies the regulations and/or policies relevant to a web page and compares the regulations and/or policies with the web page content to identify any non-compliant items.

The learner 214 generates restriction patterns 240 by learning features of the one or more extensions and correlating security and extension compliance rules (e.g., company approved, user installed for test/education purpose, etc.) for identifying and classifying web sections in a set of tagged web page samples according to marked restricted keywords or terms (e.g., confidential, first name, last name, phone number, email address, home address, etc.). The learner 214 enhances the accuracy of content categorization over time. In certain embodiments, the learner 214 employs machine learning models to learn from user interactions and adapt categorization based on web content. For example, if a phone number of (123) 456-7890 is identified as sensitive content, the learner 214 may also generate a restriction requirement that: (xxx)-xxx-xxxx is an alias of xxxxxxxxxx. Then, a phone number in these different formats would be found to be sensitive content.

The monitor 268 monitors user interactions (e.g., web surfing, extension installation, enabling and/or disabling of extensions in certain URLs, manually changing restricted sections of a web page, etc.) with the APP and/or web browser 264. The monitored information may be integrated into the data structure 234 and passed to the WEC-Bot server code 210 as requests for the learner 214, the analyzer 218, and/or the adjuster 226.

The analyzer 218 receives a request for a web page (where the request includes a URL identifier for the web page) and analyzes the web page having that URL identifier with associated extensions to determine whether the web page and extensions are trusted or not trusted according to the restriction patterns 240. In certain embodiments, the analyzer 218 uses the data structure 234 fields of extension type (trusted or not trusted) and URL type (trusted or not trusted) to make the determination of trust.

The extensions for the web pages may be retrieved from the extension servers 280a . . . 280n.

The sensitive content identifier 220 scans the web page and identifies the sections of the web page that contain sensitive content (e.g., user data, forms, images, audio, videos, confidential documents, etc.) and the sections of the web page that contain non-sensitive content (e.g., public articles, non-sensitive text).

The categorizer 222 categorizes the identified sections of the web page into sensitive (private) and non-sensitive (public) groups.

The page splitter 224 splits the web page into sub web pages based on the categorized groups. For example, the sub web pages may be a non-sensitive Sub-Web-Page-1 (i.e., a non-restricted sub web page containing non-sensitive content) and a sensitive Sub-Web-Page-2 (i.e., a restricted sub web page containing sensitive content).

The extension controller 270 interacts with the extensions and controls their behavior based on the categorization of the content. For example, the extension controller 270 determines which extensions are allowed to operate on the non-sensitive Sub-Web-Page-1 and which extensions should be restricted from the sensitive Sub-Web-Page-2. The extension controller 270 ensures that sensitive content is protected to comply with defined and learned security and extension regulations.

The validator 272 validates the restricted sections (i.e., sections that have sensitive content and are not available to an extension) to ensure the compatibilities of the extension have been processed properly based on user input. In certain embodiments, the validator 272 enables a user to validate the sensitive content and report any problems. For example, a user may validate that the telephone number: 1234567890 and the telephone number (123)-456-7890 are sensitive content in different formats.

The adjuster 226 adjusts the settings of the service profile 232, the data structure 234, criteria 236, and the user profile 238 according to the monitored user interactions to ensure features of the WEC-Bot 202 are working effectively and securely.

Figure 4:
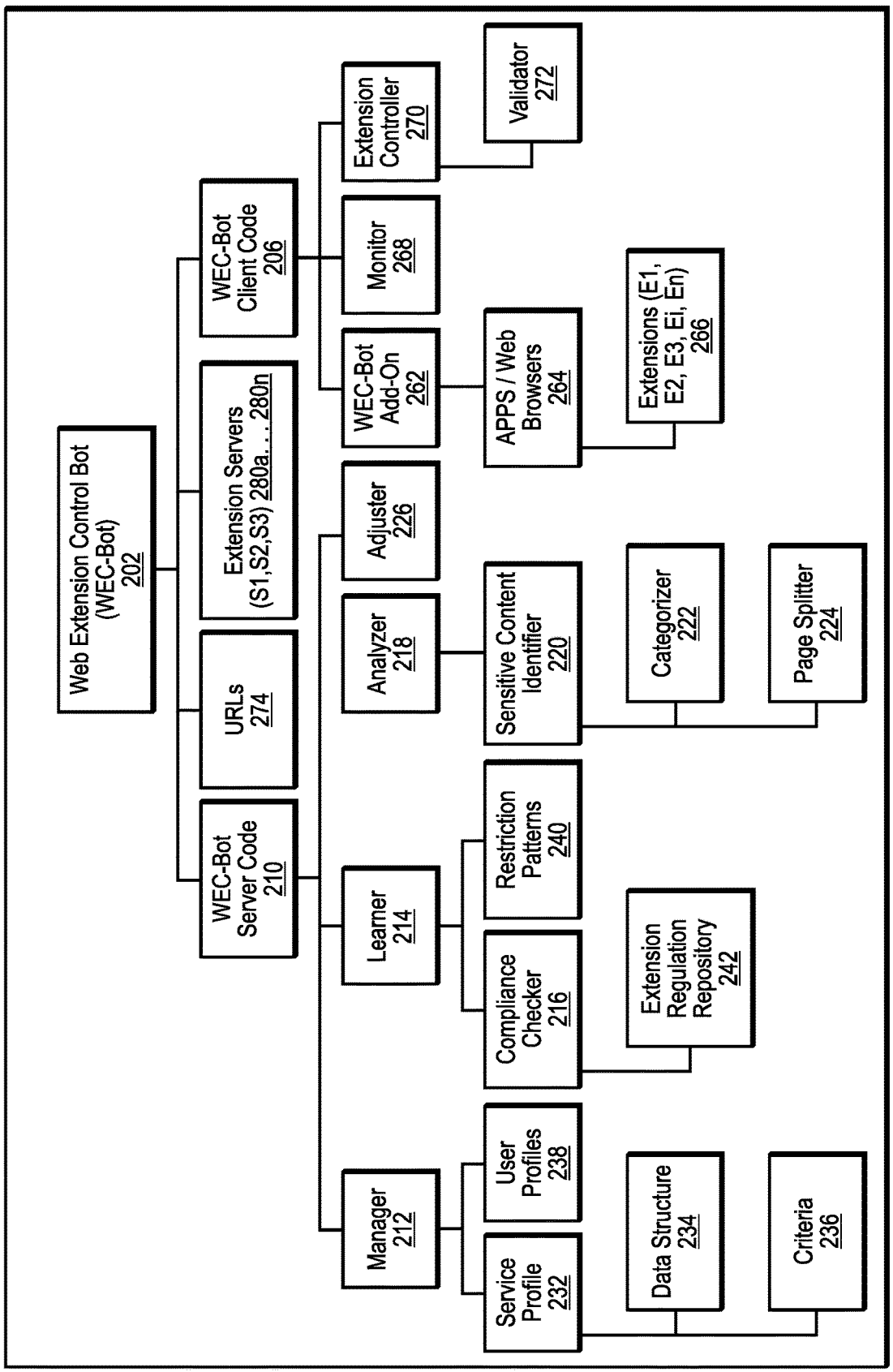
FIG. 4 illustrates components of FIG. 2 and how they are related in accordance with certain embodiments.

FIG. 4 illustrates components of FIG. 2 and how they are related in accordance with certain embodiments. The WEC-Bot client code 206 sends a request for a web page having a URL to the WEC-Bot server code 210. The WEC-Bot server code 210 returns the web page to the WEC-Bot client code 206 along with an indication of which sections of the web page have sensitive content and which sections of the web page do not have sensitive content. The WEC-Bot client code 206 displays the web page for a user while restricting the extensions in accordance with which sections of the web page have sensitive content.

In certain embodiments, the WEC-Bot 202 provides management and control of web browser extensions ("extensions"). As for fine-grained content categorization, the WEC-Bot 202 employs the analyzer 218 (a content analysis component) to categorize web page content into sensitive and non-sensitive content sections. This fine-grained categorization at the section level enables precise control over extension behavior.

As for sub web page segmentation, the WEC-Bot 202 creates separate sub web pages (e.g., Sub-Web-Page-1 for non-sensitive content and Sub-Web-Page-2 for sensitive content), which allows for the isolation of sensitive content while enabling extensions to interact with non-sensitive content.

As for user interaction analysis, the WEC-Bot 202 ensures that the user experience remains at the forefront of extension control. Users are provided with the ability to interact with the WEC-Bot 202, override automated decisions, and provide feedback, enhancing user control and satisfaction.

The WEC-Bot 202 may use machine learning and Artificial Intelligence (AI) processes to continuously improve content categorization over time to provide a forward-looking approach. The WEC-Bot 202 also learns from user interactions and adapts decisions based on evolving web content.

The WEC-Bot server code 210 and the WEC-Bot client code 206 of the WEC-Bot 202 ensure compliance with data protection regulations, including the General Data Protection Regulation (GDPR) and the California Consumer Privacy Act (CCPA). The extension controller 270 on the client side applies encryption and data anonymization techniques to protect sensitive content (i.e., sensitive data).

The validator 272 of the WEC-Bot 202 monitors extension compatibility. The validator 272 may recommend alternative extensions when incompatibilities are detected, enhancing user flexibility.

The security enforcer components safeguard extension behavior and access control, preventing unauthorized changes to extension settings and ensuring sensitive content remains secure. These security enforce components may include: the learner 214, the compliance checker 216, the restriction patterns 240, the extension regulation repository 242, the analyzer 218, the sensitive content identifier 220, and the categorizer 222.

The compliance checker 216, the restriction patterns 240, and the extension regulation repository 242 keep a close watch on data protection regulations and sensitive content protection laws, providing alerts and notifications in case of potential compliance issues.

The compliance checker 216 may be described as a user guide assistant that offers user education and guidance on how to use the WEC-Bot 202 effectively and securely, enhancing user awareness and interaction.

The validator 272 and the adjuster 226 may be described as performance optimizers that focus on resource efficiency, ensuring the WEC-Bot 202 and extensions operate efficiently without causing system performance issues to provide a seamless user experience.

Thus, the WEC-Bot 202 provides a holistic solution to the multifaceted challenges associated with extensions, enhancing security and user control. The WEC-Bot 202 focuses on fine-grained content categorization and user interaction to provide a comprehensive approach to extension management.

Figure 5A:
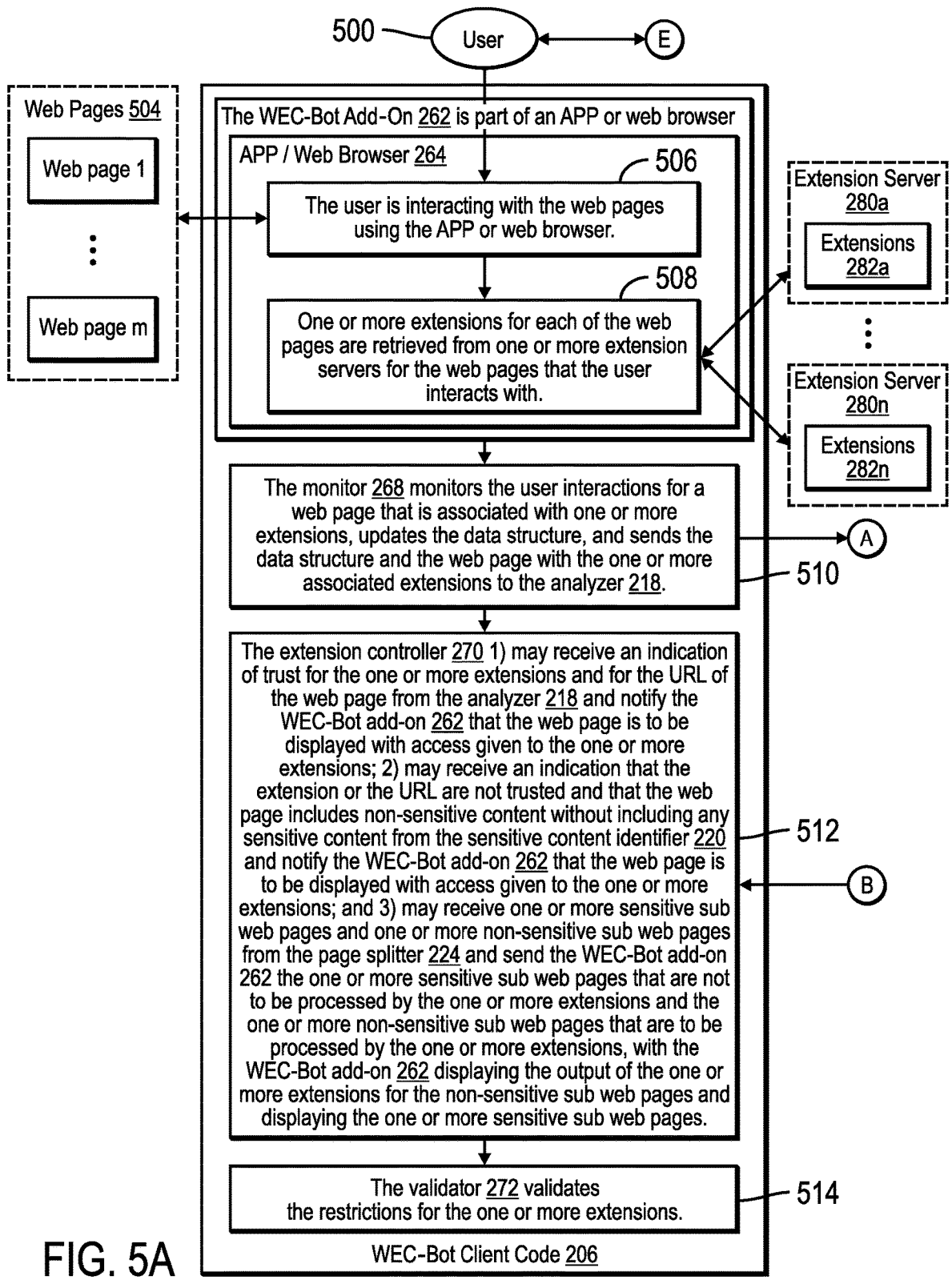
FIGS. 5A, 5B, and 5C illustrate, in a flowchart, operations for providing security with a WEC-Bot in accordance with certain embodiments.
Figure 5B:
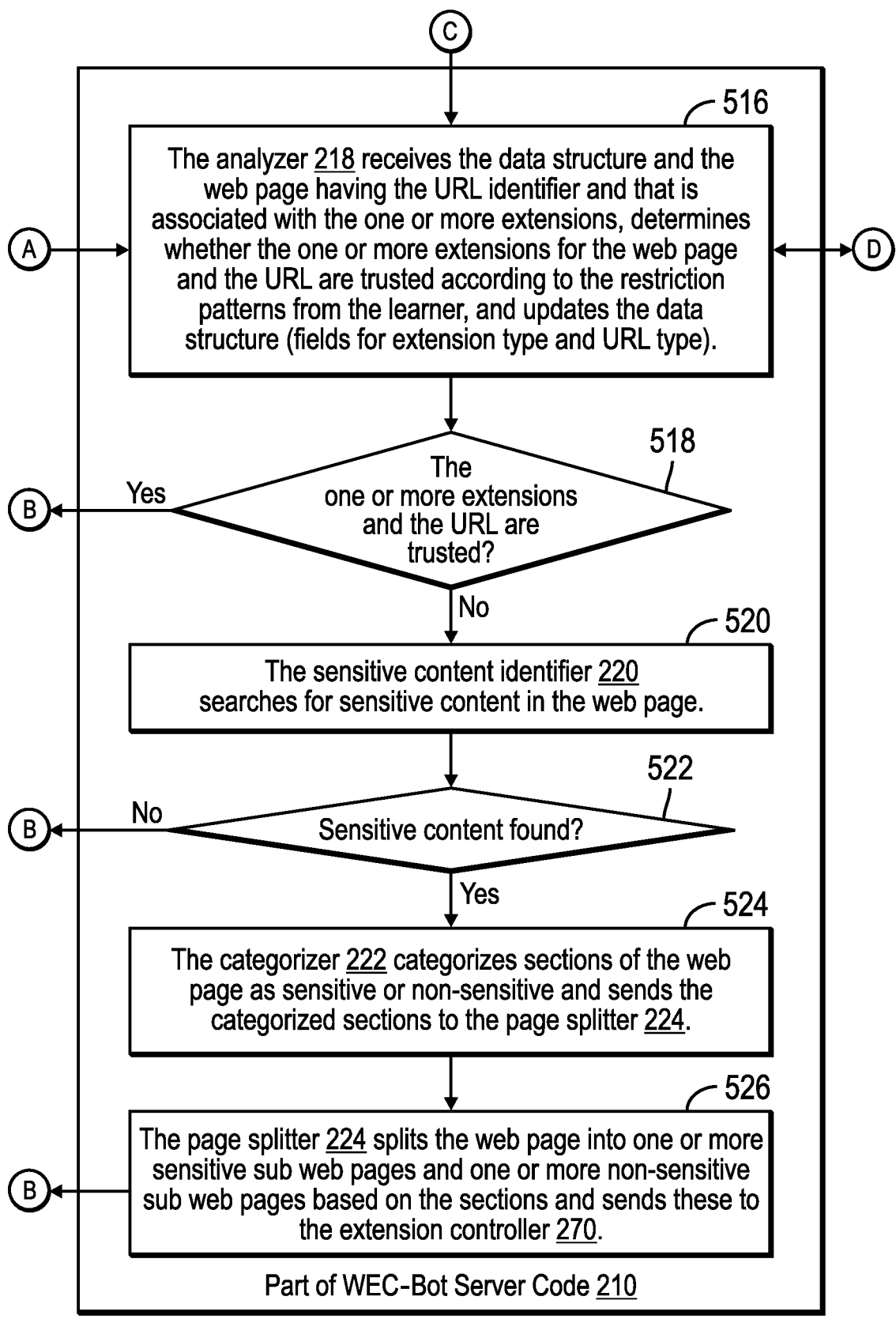
Figure 5C:
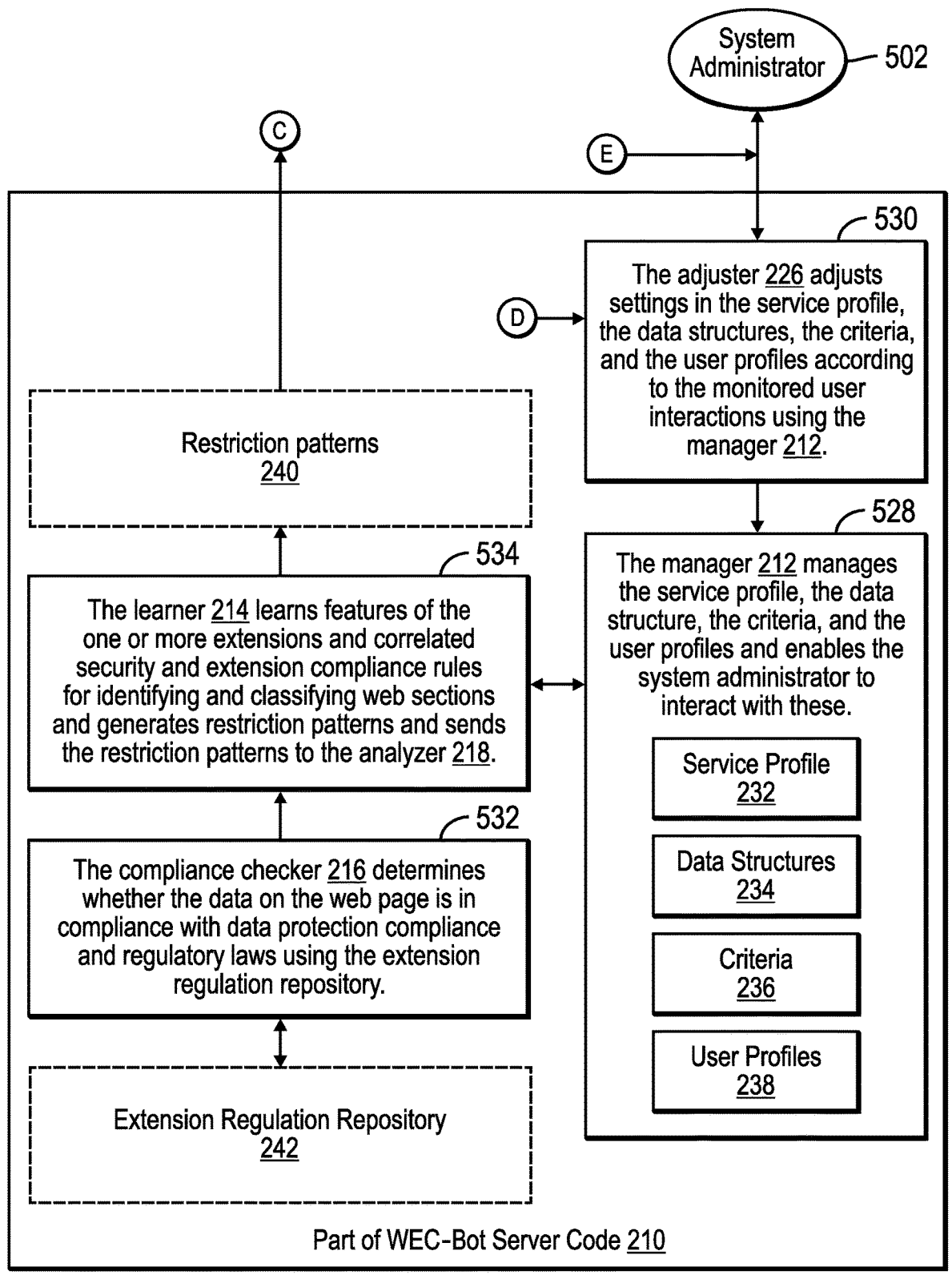

FIGS. 5A, 5B, and 5C illustrate, in a flowchart, operations for providing security with a WEC-Bot in accordance with certain embodiments. A user 500 (FIG. 5A) interacts with the WEC-Bot client code 206, while a system administrator 502 (FIG. 5C) interacts with the WEC-Bot server code 210. A WEC-Bot add-on 262 is installed on an APP or web browser 264 for managing one or more extensions installed on that APP or web browser 264. One or more extensions 266 may be associated with the APP or web browser 264. In block 506, the user 500 is interacting with the web pages 504 using the APP or web browser 264. In block 508, one or more extensions for each of the web pages are retrieved from one or more extension servers 280a . . . 280n for the web pages 504 that that the user interacts with.

In block 510, the monitor 268 monitors the user interactions for a web page 504 that is associated with one or more extensions, updates the data structure 234 (with a new row for each different extension identifier field with the same URL identifier field), and sends the data structure 234 and the web page 504 that is associated with the one or more extensions to the analyzer 218. In certain embodiments, the monitor 268 monitors user interactions of: web surfing, extension installation, enabling and/or disabling of extensions in URLs, manually changing restricted sections, etc. In certain embodiments, the monitored information may be integrated into the data structure 234 and passed to the WEC-Bot server code 210 as a request for the analyzer 218, the learner 214, and/or the adjuster 226.

In block 512, the extension controller 270 1) may receive an indication of trust for the one or more extensions and for the URL of the web page from the analyzer 218 and notify the WEC-Bot add-on 262 that the web page is to be displayed with access given to the one or more extensions; 2) may receive an indication that the extension or the URL are not trusted and that the web page includes non-sensitive content without including any sensitive content from the sensitive content identifier 220 and notify the WEC-Bot add-on 262 that the web page is to be displayed with access given to the one or more extensions; and 3) may receive one or more sensitive sub web pages and one or more non-sensitive sub web pages from the page splitter 224 and send the WEC-Bot add-on 262 the one or more sensitive sub web pages that are not to be processed by the one or more extensions and the one or more non-sensitive sub web pages that are to be processed by the one or more extensions, with the WEC-Bot add-on 262 displaying the output of the one or more extensions for the non-sensitive sub web pages and displaying the one or more sensitive sub web pages.

In certain embodiments, if there are multiple extensions, and one is not trusted while the others are trusted, then an indication of not trusted is returned. Thus, based on what is received, the extension controller 270 interacts with the one or more extensions and controls their behavior based on the categorization of the content. The extension controller 270 determines which of the one or more extensions are allowed to operate on each of the sub web pages and which of the one or more extensions are restricted from access to each of the sub web pages. In this manner, the extension controller 270 ensures that sensitive content is protected and complies with defined and learned security and extension regulations.

In block 514, the validator 272 validates the restrictions for the one or more extensions. That is, the validator 272 checks whether the one or more extensions should be restricted from particular sections of the web page. In certain embodiments, the validator 272 allows a user to validate the sensitive (restricted) sections to ensure the compatibilities of the one or more extensions with the WEC-Bot 202 have been processed properly.

In certain embodiments, if there is a universal setting in the service profile 232 that ABC extension is restricted, then the ABC extension cannot be added by a user, unless the user has a certain privilege level to change it. On the other hand, if the ABC extension is not restricted in the service profile 232, then the ABC extension may be added or removed for any user.

In block 516 (FIG. 5B), the analyzer 218 receives the data structure (and saves the data structure 234, receives the web page having the URL identifier and that is associated with the one or more extensions, determines whether the one or more extensions for the web page and the URL (of the URL identifier) for the web page are trusted according to the restriction patterns 240 from the learner 214, and updates the data structure (fields for extension type and URL type).

In block 518, the analyzer 218 determines whether both the extension and the URL are to be trusted. If so, the analyzer 218 sends an indication of trust to the extension controller 270, otherwise, processing continues to block 520.

In block 520, the sensitive content identifier 220 searches for sensitive content in the web page. In certain embodiments, the sensitive content identifier 220 scans the web page and identifies the sections of the web page that contain sensitive content (e.g., user data, forms, images, audio, videos, confidential documents, etc.) and the sections of the web page that contain non-sensitive content (e.g., public articles, non-sensitive text).

In block 522, the sensitive content identifier 220 determines whether sensitive content was found. If so, processing continues to block 524, otherwise, the sensitive content identifier 220 sends an indication that there is no sensitive content to the extension controller 270.

In block 524, the categorizer 222 categorizes sections of the web page 504 as sensitive or non-sensitive and sends the categorized sections to the page splitter 224.

In block 526, the page splitter 224 splits the web page into sub web pages based on the sections and sends the sub web pages to the extension controller 270. For example, the sub web pages may be Sub-Web-Page-1 (containing non-sensitive content) and Sub-Web-Page-2 (containing sensitive content).

In block 528, the manager 212 manages the service profile 232, the data structure 234, the criteria 236, and the user profiles 238 and enables the system administrator 502 to interact with these via the adjuster 226. In block 530, the adjuster 226 adjusts settings in the service profile 232, the data structure 234, the criteria 236, and the user profiles 238 according to the monitored user interactions using the manager 212.

In block 532, the compliance checker 216 determines whether the data on the web page is in compliance with data protection compliance and regulatory laws using the extension regulation repository 242.

In block 534, the learner 214 learns features of the extension and correlated security and extension compliance rules for identifying and classifying web sections and generates restriction patterns 240 and sends the restriction patterns 240 to the analyzer 218.

Figure 6:
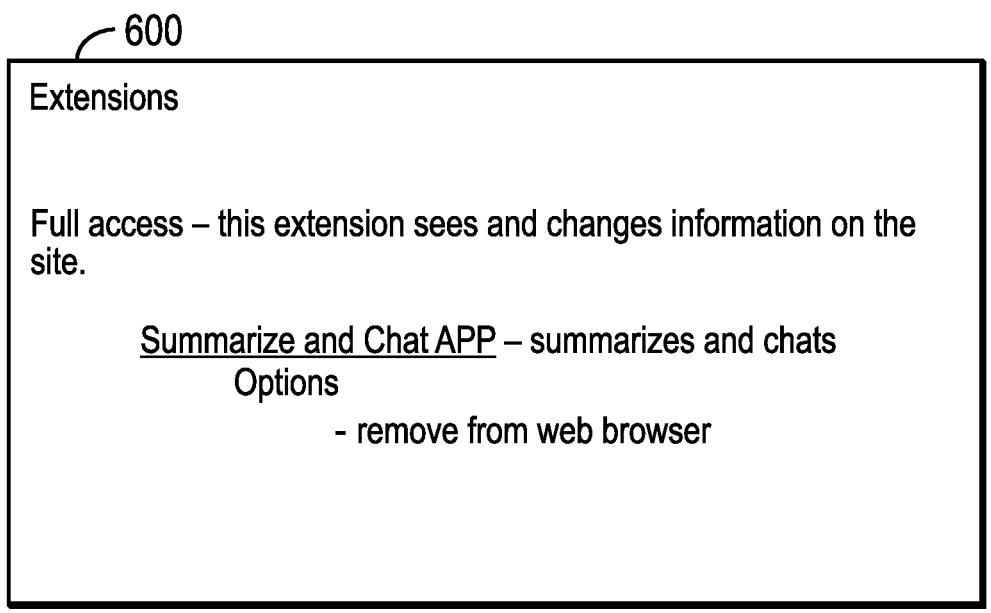
FIG. 6 illustrates an example extension in accordance with certain embodiments.

FIG. 6 illustrates an example extension in accordance with certain embodiments. User interface 600 indicates that a summarize and chat APP is an extension, and there is an option to remove the extension from the web browser or use the extension. Embodiments add the ability to restrict the extension from accessing sensitive content.

FIG. 7 illustrates an example web page and summary in accordance with certain embodiments. In FIG. 7, a web page 700 includes sensitive content 710. The summarize and chat APP provides a summary 720 that includes the sensitive content 730. In this example, no check is made on whether the extension is trusted or not trusted. In this example, the summarize and chat APP exposes sensitive content 730.

Figure 8:
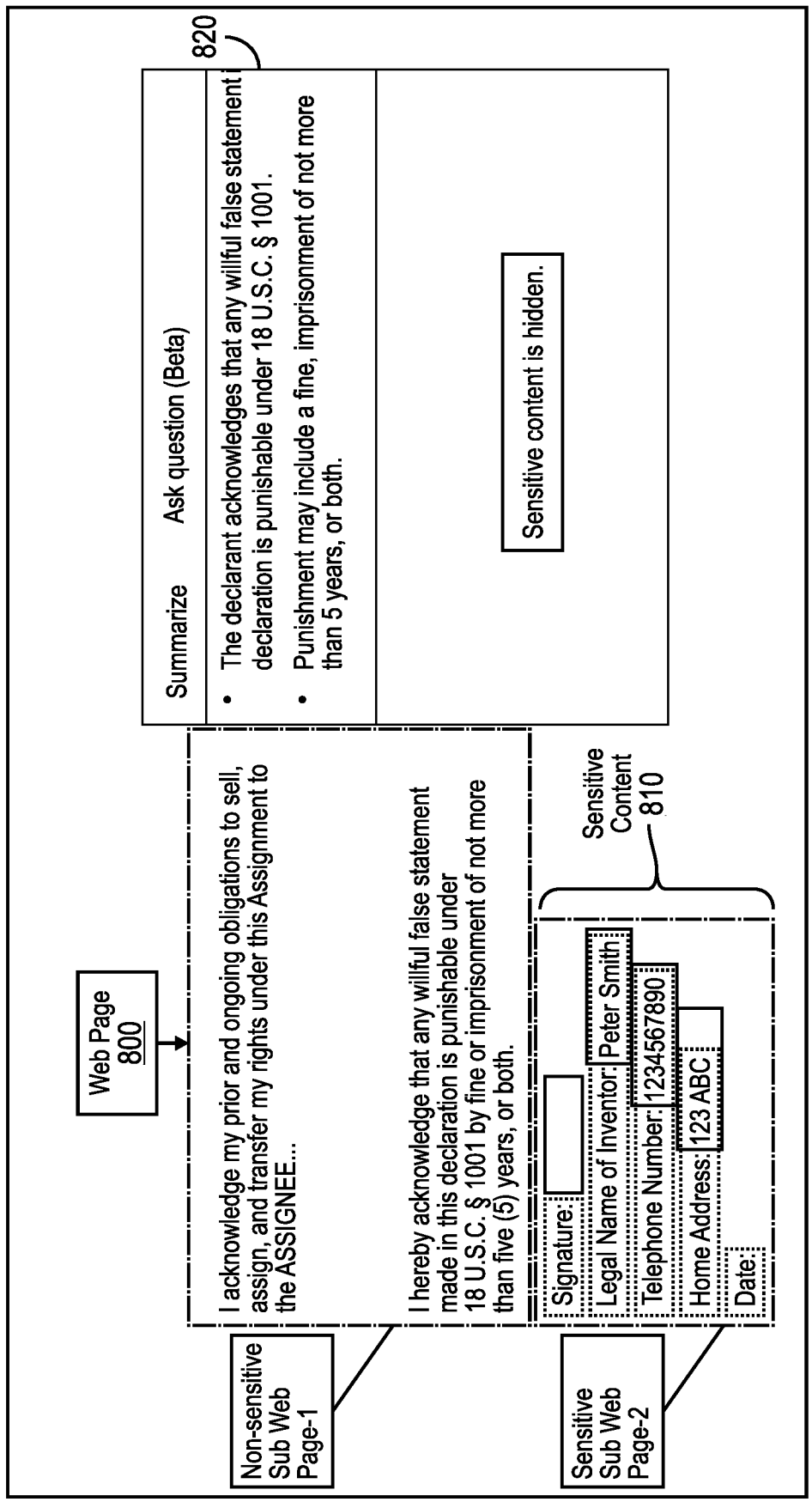
FIG. 8 illustrates an example web page and summary that protects sensitive content in accordance with certain embodiments.

FIG. 8 illustrates an example web page and summary that protects sensitive content in accordance with certain embodiments. In FIG. 8, a web page 800 includes sensitive content 810. The WEC-Bot 202 creates a non-sensitive Sub-Web-Page-1 with non-sensitive content and a sensitive Sub-Web-Page-2 with sensitive content 810 for the web page 800. The summarize and chat APP receives the non-sensitive Sub-Web-Page-1 and does not receive the sensitive Sub-Web-Page-2. The summarize and chat APP provides a summary 820 of the non-sensitive Sub-Web-Page-1. The extension does not receive the sensitive Sub-Web-Page-2, and therefore, the extension is not able to access the sensitive content 810. In this example, the WEC-Bot 202 supports restricting the extension by blocking sensitive content. The WEC-Bot 202 dynamically restricts access to sensitive content by the extension.

Figure 9:
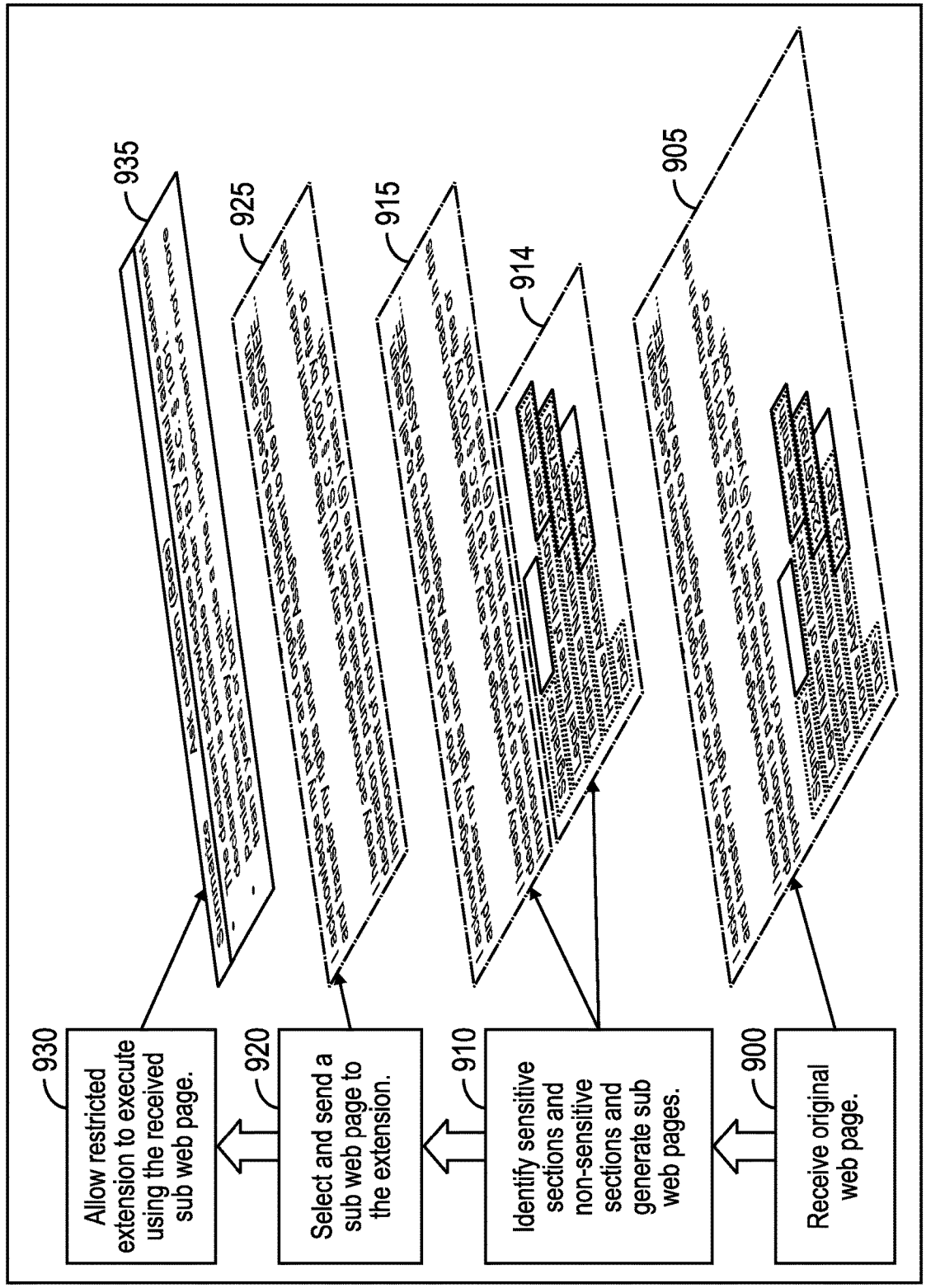
FIG. 9 illustrates selection of sections to send to an extension in accordance with certain embodiments.

FIG. 9 illustrates selection of sections to send to an extension in accordance with certain embodiments. In block 900, the WEC-Bot 202 receives an original web page 905. In block 910, the WEC-Bot 202 identifies sensitive sections and non-sensitive sections and generates a sensitive sub web page 914 and a non-sensitive sub web page 915. In block 920, the WEC-Bot 202 selects the sub web page 925 with non-sensitive content and sends that to the extension. In block 930, the WEC-Bot 202 allows the extension (i.e., a restricted extension) to execute using the sub web page 925 to generate a summary 935. The extension executes to perform one or more operations (e.g., a summarization operation) on the sub web page 925.

Figure 10:
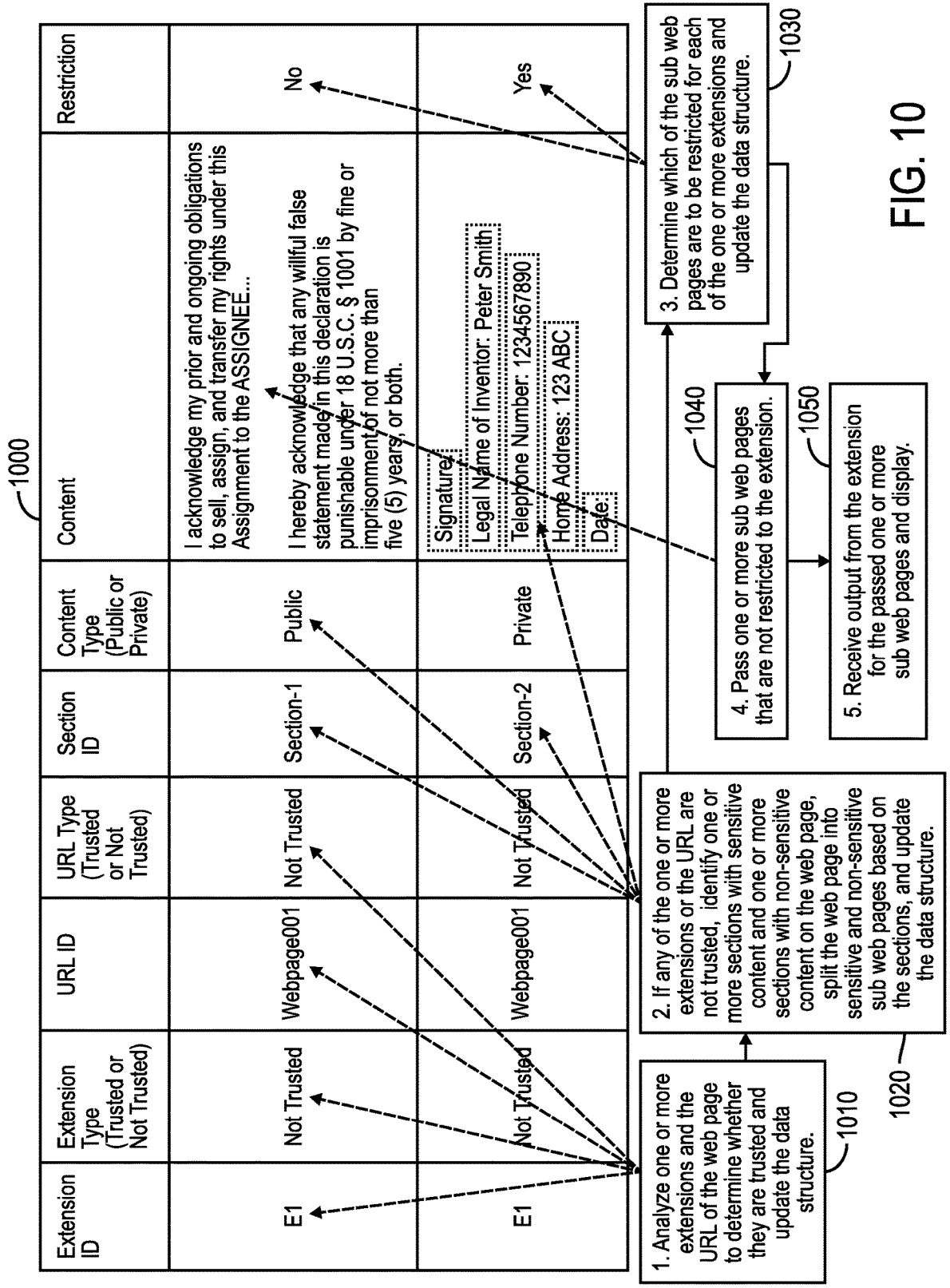
FIG. 10 illustrates an example data structure in accordance with certain embodiments.

FIG. 10 illustrates an example data structure 1000 in accordance with certain embodiments. In certain embodiments, the data structure 1000 is initially updated with the extension ID, the URL ID, and the content. In block 1010, the WEC-Bot 202 analyzes one or more extensions and the URL of the web page to determine whether they are to be trusted and updates the data structure 1000 (fields extension type and URL type for each of the extensions). In block 1020, if any of the one or more extensions or the URL are not trusted, WEC-Bot 202 identifies sections with sensitive content and sections with non-sensitive content on the web page, splits the web page into sensitive and non-sensitive sub web pages based on the sections, and updates the data structure 1000 (fields section ID and content type). In block 1030, the WEC-Bot 202 determines which of the sub web pages are to be restricted for each of the one or more extensions and updates the data structure 1000 (field restricted for extension). In block 1040, the WEC-Bot 202 passes one or more sub web pages that are not restricted (i.e., don't have sensitive content) to the extension. In block 1050, the WEC-Bot 202 receives output from the extension for the one or more sub web pages and displays the output (e.g., a summary from a summarize and chat APP).

Figure 11:
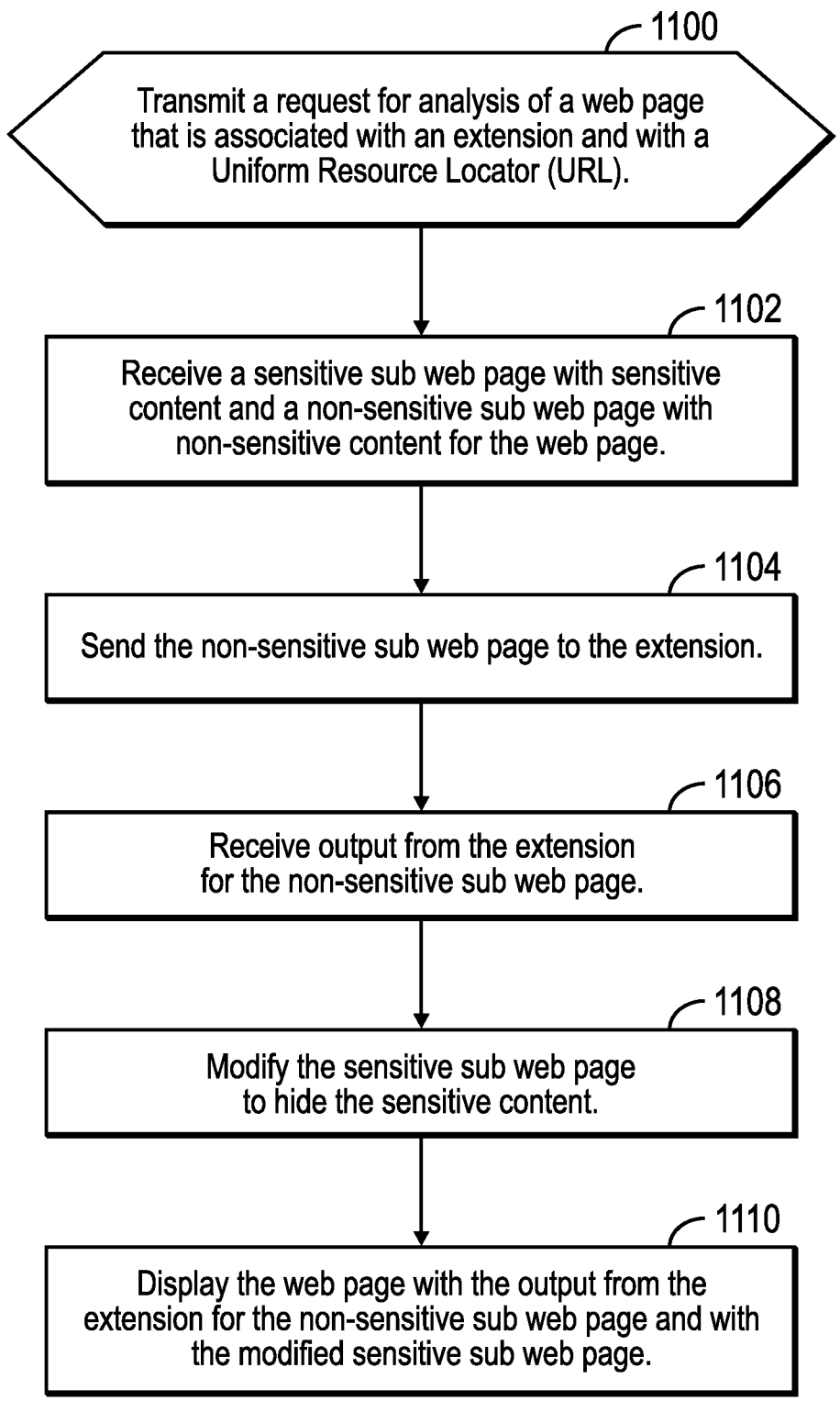
FIG. 11 illustrates, in a flowchart, operations for generating and displaying sub web pages to hide sensitive content of a web page in accordance with certain embodiments.

FIG. 11 illustrates, in a flowchart, operations for generating and displaying sub web pages to hide sensitive content of a web page in accordance with certain embodiments. Control begins at block 1100 with the WEC-Bot client code 206 of the WEC-Bot 202 transmitting a request for analysis of a web page that is associated with an extension and with a Uniform Resource Locator (URL). In block 1102, the WEC-Bot client code 206 receives a sensitive sub web page with sensitive content and a non-sensitive sub web page with non-sensitive content for the web page. The extension is restricted from accessing the sensitive sub web page.

In block 1104, the WEC-Bot client code 206 sends the non-sensitive sub web page to the extension. In block 1106, the WEC-Bot client code 206 receives output from the extension for the non-sensitive sub web page. The output is based on the operations performed by the extension. For example, for an extension that performs translation, the output is a translation of the non-sensitive sub web page. As another example, for an extension that performs summarization, the output is a summary of the non-sensitive sub web page.

In block 1108, the WEC-Bot client code 206 modifies the sensitive sub web page to hide the sensitive content (e.g., using at least one of encryption and data anonymization). In block 1110, the WEC-Bot client code 206 displays the web page with the output from the extension for the non-sensitive sub web page and with the modified sensitive sub web page.

In certain embodiments, the operations of blocks 1104-1110 occur in response to the operation of receiving a sensitive sub web page with sensitive content and a non-sensitive sub web page with non-sensitive content for the web page of block 1102.

In certain embodiments, in block 1110, the WEC-Bot client code 206 displays the web page with the output from the extension for the non-sensitive sub web page and without the modified sensitive sub web page.

In certain embodiments, multiple extensions are associated with the web page, and the non-sensitive sub web page is sent to the multiple extensions. In certain embodiments, multiple extensions are associated with the web page, and the non-sensitive sub web page is sent to a subset of the multiple extensions (e.g., to one extension, to two out of five extensions, etc.).

In certain embodiments, in response to receiving an indication that the extension and the URL are trusted, the WEC-Bot client code 206 allows the extension to access the web page. In particular, WEC-Bot client code 206 sends the web page to the extension, receives new output from the extension for the web page, and displays the web page with the new output.

In certain embodiments, in response to receiving an indication that the extension or the URL are not trusted and that the web page includes non-sensitive content without including sensitive content, the WEC-Bot client code 206 allows the extension to access the web page. In particular, WEC-Bot client code 206 sends the web page to the extension, receives new output from the extension for the web page, and displays the web page with the new output.

In certain embodiments, the WEC-Bot server code 210 of the WEC-Bot 202 learns features of the extension and compliance rules (e.g., security and extension compliance rules) for identifying and classifying sections of the web page; generates restriction patterns and determines whether the extension and the URL are trusted based on the restriction patterns.

In certain embodiments, the WEC-Bot server code 210 scans the web page to identify a first section of the web page that contains sensitive content and a second section of the web page that contains non-sensitive content and splits the web page into the restricted sub web page and the non-restricted sub web page based on the identified first section and the identified second section.

In certain embodiments, the WEC-Bot client code 206 validates the restricted sub web page in response to user input.

In certain embodiments, the WEC-Bot server code 210 checks the content of the web page against data protection regulations and sensitive content protection laws in an extension regulation repository and issues alerts regarding compliance issues.

The WEC-Bot 202 avoids the security and usability challenges often found with extensions. For security risks and sensitive content protection concerns, the open and dynamic nature of extensions exposes users to security vulnerabilities because extensions, due to their level of access to web pages, may access sensitive user data, including login credentials, user information, and browsing histories. Mishandling of this data may result in sensitive content breaches. However, the WEC-Bot 202 prevents access to sensitive content to avoid these security risks and sensitive content protection concerns.

As for content discrepancies and security gaps, in some instances, web pages contain a mix of both sensitive and non-sensitive content. For example, a web page may include sections with publicly available content, such as news articles or product descriptions, alongside sections with sensitive content. The WEC-Bot 202 manages extensions on such web pages to provide security and sensitive content protection.

As for blind application of extension control, enabling or disabling extensions at the domain or URL level may not offer the granularity to address content discrepancies. This is because enabling or disabling an extension applies to the entire web page, affecting both sensitive and non-sensitive sections. The WEC-Bot 202 provides granularity by disabling the extension to a portion of the web page that has sensitive content.

As for extension exposure to sensitive content, in scenarios in which extensions interact with web content that includes sensitive information, there is a risk of exposing such data to the extension, which may compromise sensitive content and may leave room for content breaches and misuse. On the other hand, the WEC-Bot 202 prevents such interaction of extensions and web content that includes sensitive information.

As for user experience impacts and intrusive or unwanted features, users face usability issues with browser extensions. Extensions may sometimes introduce features or behaviors that users find intrusive or disruptive to their browsing experiences, which may lead to user frustration and the temptation to disable extensions that may otherwise be beneficial. However, the WEC-Bot 202 is able to limit features of extensions.

The WEC-Bot 202 creates a safer, more user-friendly, and more efficient web browsing environment. Users gain control over their online activities, organizations are able to uphold data protection standards, and the browsing ecosystem benefits from greater security and sensitive content safeguards.

Users benefit from a higher level of sensitive content protection and security as the WEC-Bot 202 isolates sensitive content from extensions. This reduces the risk of data breaches and unauthorized access to the sensitive content.

The WEC-Bot 202 provides fine-grained control over extension behavior, allowing extensions to interact with non-sensitive content, while not accessing sensitive content. This level of control minimizes the risk of extensions compromising sensitive content.

The WEC-Bot 202 includes user interaction analysis to improve determination of sensitive and non-sensitive content. In addition, the WEC-Bot 202 provides user interfaces to enable users to make decisions, provide feedback, and tailor the extension behavior according to their preferences.

With the WEC-Bot 202, users enjoy extensions without the intrusion of unwanted or disruptive features, contributing to an improved and more pleasant browsing experience.

The WEC-Bot 202 assists with regulatory compliance so that organizations may achieve compliance with data protection regulations, reducing the risk of legal and financial consequences associated with non-compliance.

The WEC-Bot 202 provides extension compatibility management through checking compatibility to find compatible extensions, reducing conflicts and ensuring that users are able to harness the full potential of their web browser.

The WEC-Bot 202 includes a compliance checker 216 to provide users with guidance on how to use the WEC-Bot 202 effectively, ensuring users are able to utilize the system to its fullest potential.

The WEC-Bot 202 provides comprehensive security enforcement with a security enforcer component that prevents unauthorized changes, enhancing overall security. For example, if a company rule indicates that the content in a company internal web page URL XYX cannot be accessed by extension ABC, then normal user cannot enable extension ABC to access URL XYX unless the user has a special privilege or role.

The WEC-Bot 202 provides audit logging and a feedback mechanism to promote transparency and accountability in extension management, making it easier to identify and address issues.

The WEC-Bot 202 empowers users to take control of their web browser experience, giving them the tools and information to manage extensions and protect their sensitive content.

The WEC-Bot 202 evolves and adapts behavior to accommodate changing web content and the extension ecosystem.

The letter designators, such as i, among others, are used to designate an instance of an element, i.e., a given element, or a variable number of instances of that element when used with the same or different elements.

The terms "an embodiment", "embodiment", "embodiments", "the embodiment", "the embodiments", "one or more embodiments", "some embodiments", and "one embodiment" mean "one or more (but not all) embodiments of the present invention(s)" unless expressly specified otherwise.

The terms "including", "comprising", "having" and variations thereof mean "including but not limited to", unless expressly specified otherwise.

The enumerated listing of items does not imply that any or all of the items are mutually exclusive, unless expressly specified otherwise.

The terms "a", "an" and "the" mean "one or more", unless expressly specified otherwise.

Devices that are in communication with each other need not be in continuous communication with each other, unless expressly specified otherwise. In addition, devices that are in communication with each other may communicate directly or indirectly through one or more intermediaries.

A description of an embodiment with several components in communication with each other does not imply that all such components are required. On the contrary a variety of optional components are described to illustrate the wide variety of possible embodiments of the present invention.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments of the present invention need not include the device itself.

The foregoing description of various embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims herein after appended.

What is claimed is:

1. A computer-implemented method, comprising operations for:
    transmitting a request for analysis of an original web page that is associated with an extension and with a Uniform Resource Locator (URL); and
    in response to receiving a sensitive sub web page generated with sensitive content of the original web page and a non-sensitive sub web page generated with non-sensitive content of the original web page,
        sending the non-sensitive sub web page to the extension;
        receiving output from the extension for the non-sensitive sub web page, wherein the output is based on one or more operations performed by the extension on the non-sensitive sub web page;
        modifying the sensitive sub web page to hide the sensitive content with data anonymization; and
        displaying the original web page with the output from the extension for the non-sensitive sub web page and with the modified sensitive sub web page.

2. The computer-implemented method of claim 1, further comprising operations for:
    in response to receiving an indication that the extension and the URL are trusted,
        sending the original web page to the extension;
        receiving new output from the extension for the original web page; and
        displaying the original web page with the new output.

3. The computer-implemented method of claim 1, further comprising operations for:
    in response to receiving an indication that the extension or the URL are not trusted and that the original web page includes any non-sensitive content without including any sensitive content,
        sending the original web page to the extension;
        receiving new output from the extension for the original web page; and
        displaying the original web page with the new output.

4. The computer-implemented method of claim 1, further comprising operations for:
    learning features of the extension and compliance rules for identifying and classifying sections of the original web page;
    generating restriction patterns; and
    determining whether the extension and the URL are trusted based on the restriction patterns.

5. The computer-implemented method of claim 1, further comprising operations for:
    scanning the original web page to identify a first section of the original web page that contains the sensitive content and to identify a second section of the original web page that contains the non-sensitive content; and
    splitting the original web page into the sensitive sub web page and the non-sensitive sub web page based on the identified first section and the identified second section.

6. The computer-implemented method of claim 1, further comprising operations for:
    validating the sensitive sub web page in response to user input.

7. The computer-implemented method of claim 1, further comprising operations for:
    checking content of the original web page against data protection regulations and sensitive content protection laws in an extension regulation repository; and
    issuing alerts regarding compliance issues.

8. A computer program product, the computer program product comprising a computer readable storage medium having program instructions embodied therewith, the program instructions executable by a processor to cause the processor to perform operations for:

transmitting a request for analysis of an original web page that is associated with an extension and with a Uniform Resource Locator (URL); and in response to receiving a sensitive sub web page generated with sensitive content of the original web page and a non-sensitive sub web page generated with non-sensitive content of the original web page, sending the non-sensitive sub web page to the extension;

receiving output from the extension for the non-sensitive sub web page, wherein the output is based on one or more operations performed by the extension on the non-sensitive sub web page;

modifying the sensitive sub web page to hide the sensitive content with data anonymization; and displaying the original web page with the output from the extension for the non-sensitive sub web page and with the modified sensitive sub web page.

9. The computer program product of claim 8, wherein the program instructions are executable by the processor to cause the processor to perform further operations for:

in response to receiving an indication that the extension and the URL are trusted, sending the original web page to the extension;

receiving new output from the extension for the original web page; and displaying the original web page with the new output.

10. The computer program product of claim 8, wherein the program instructions are executable by the processor to cause the processor to perform further operations for:

in response to receiving an indication that the extension or the URL are not trusted and that the original web page includes any non-sensitive content without including any sensitive content, sending the original web page to the extension;

receiving new output from the extension for the original web page; and displaying the original web page with the new output.

11. The computer program product of claim 8, wherein the program instructions are executable by the processor to cause the processor to perform further operations for:

learning features of the extension and compliance rules for identifying and classifying sections of the original web page;

generating restriction patterns; and determining whether the extension and the URL are trusted based on the restriction patterns.

12. The computer program product of claim 8, wherein the program instructions are executable by the processor to cause the processor to perform further operations for:

scanning the original web page to identify a first section of the original web page that contains the sensitive content and to identify a second section of the original web page that contains the non-sensitive content; and splitting the original web page into the sensitive sub web page and the non-sensitive sub web page based on the identified first section and the identified second section.

13. The computer program product of claim 8, wherein the program instructions are executable by the processor to cause the processor to perform further operations for:

validating the sensitive sub web page in response to user input.

14. The computer program product of claim 8, wherein the program instructions are executable by the processor to cause the processor to perform further operations for:

checking content of the original web page against data protection regulations and sensitive content protection laws in an extension regulation repository; and issuing alerts regarding compliance issues.

15. A computer system, comprising:

one or more processors, one or more computer-readable memories and one or more computer-readable, tangible storage devices; and program instructions, stored on at least one of the one or more computer-readable, tangible storage devices for execution by at least one of the one or more processors via at least one of the one or more computer-readable memories, to perform operations comprising:

transmitting a request for analysis of an original web page that is associated with an extension and with a Uniform Resource Locator (URL); and in response to receiving a sensitive sub web page generated with sensitive content of the original web page and a non-sensitive sub web page generated with non-sensitive content of the original web page, sending the non-sensitive sub web page to the extension;

receiving output from the extension for the non-sensitive sub web page, wherein the output is based on one or more operations performed by the extension on the non-sensitive sub web page;

modifying the sensitive sub web page to hide the sensitive content with data anonymization; and displaying the original web page with the output from the extension for the non-sensitive sub web page and with the modified sensitive sub web page.

16. The computer system of claim 15, wherein the program instructions perform further operations comprising:

in response to receiving an indication that the extension and the URL are trusted, sending the original web page to the extension;

receiving new output from the extension for the original web page; and displaying the original web page with the new output.

17. The computer system of claim 15, wherein the program instructions perform further operations comprising:

in response to receiving an indication that the extension or the URL are not trusted and that the original web page includes any non-sensitive content without including any sensitive content, sending the original web page to the extension;

receiving new output from the extension for the original web page; and displaying the original web page with the new output.

18. The computer system of claim 15, wherein the program instructions perform further operations comprising:

learning features of the extension and compliance rules for identifying and classifying sections of the original web page;

generating restriction patterns; and determining whether the extension and the URL are trusted based on the restriction patterns.

19. The computer system of claim 15, wherein the program instructions perform further operations comprising:

scanning the original web page to identify a first section of the original web page that contains the sensitive content and to identify a second section of the original web page that contains the non-sensitive content; and splitting the original web page into the sensitive sub web page and the non-sensitive sub web page based on the identified first section and the identified second section.

20. The computer system of claim 15, wherein the program instructions perform further operations comprising:
validating the sensitive sub web page in response to user input.

* * * * *